C. L. BRALEY.
GARMENT PRESSING MACHINE.
APPLICATION FILED SEPT. 4, 1915.
1,202,358.
Patented Oct. 24, 1916.
7 SHEETS—SHEET 1.
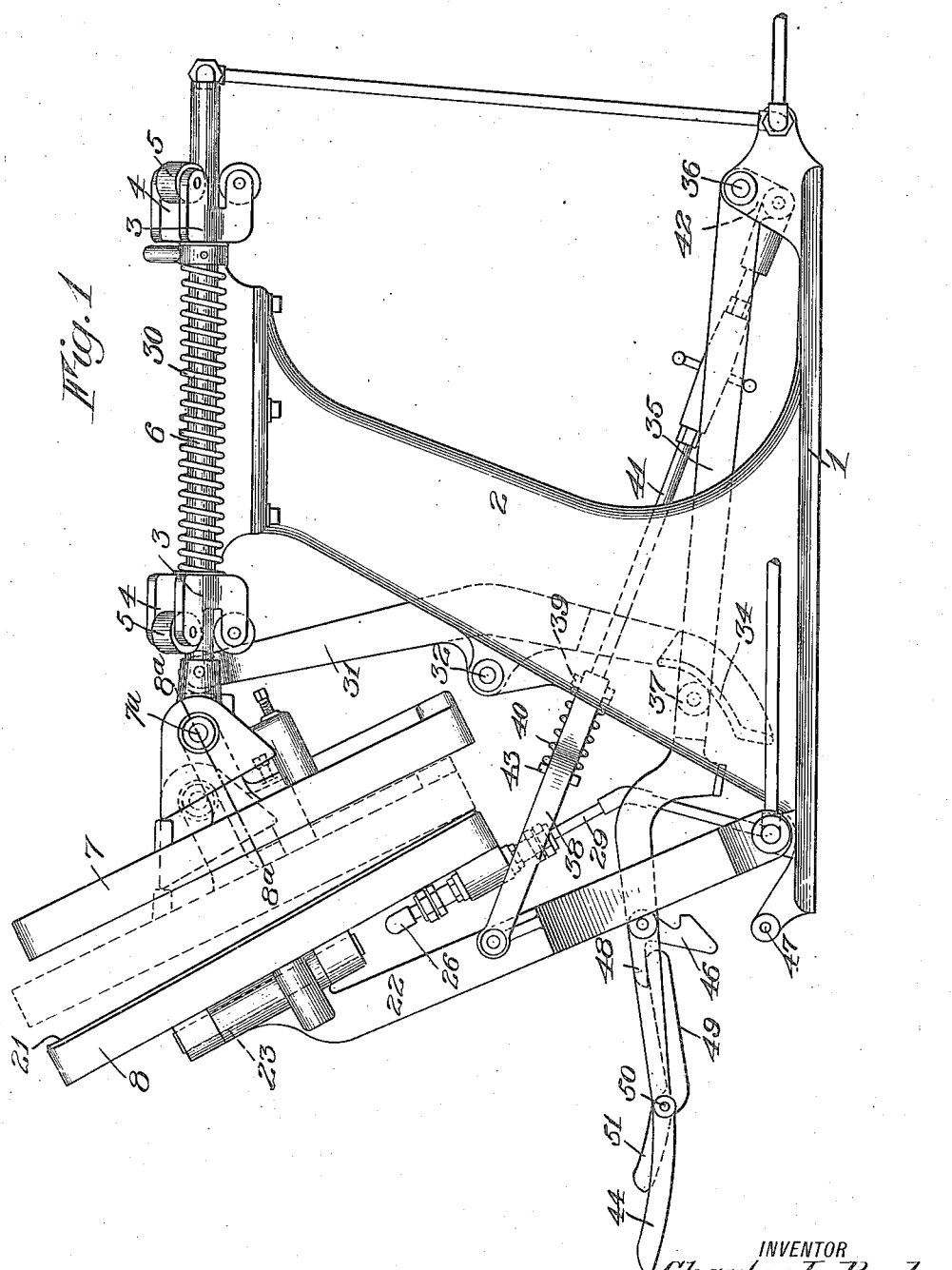
INVENTOR
Charles L. Braley
BY
his ATTORNEYS

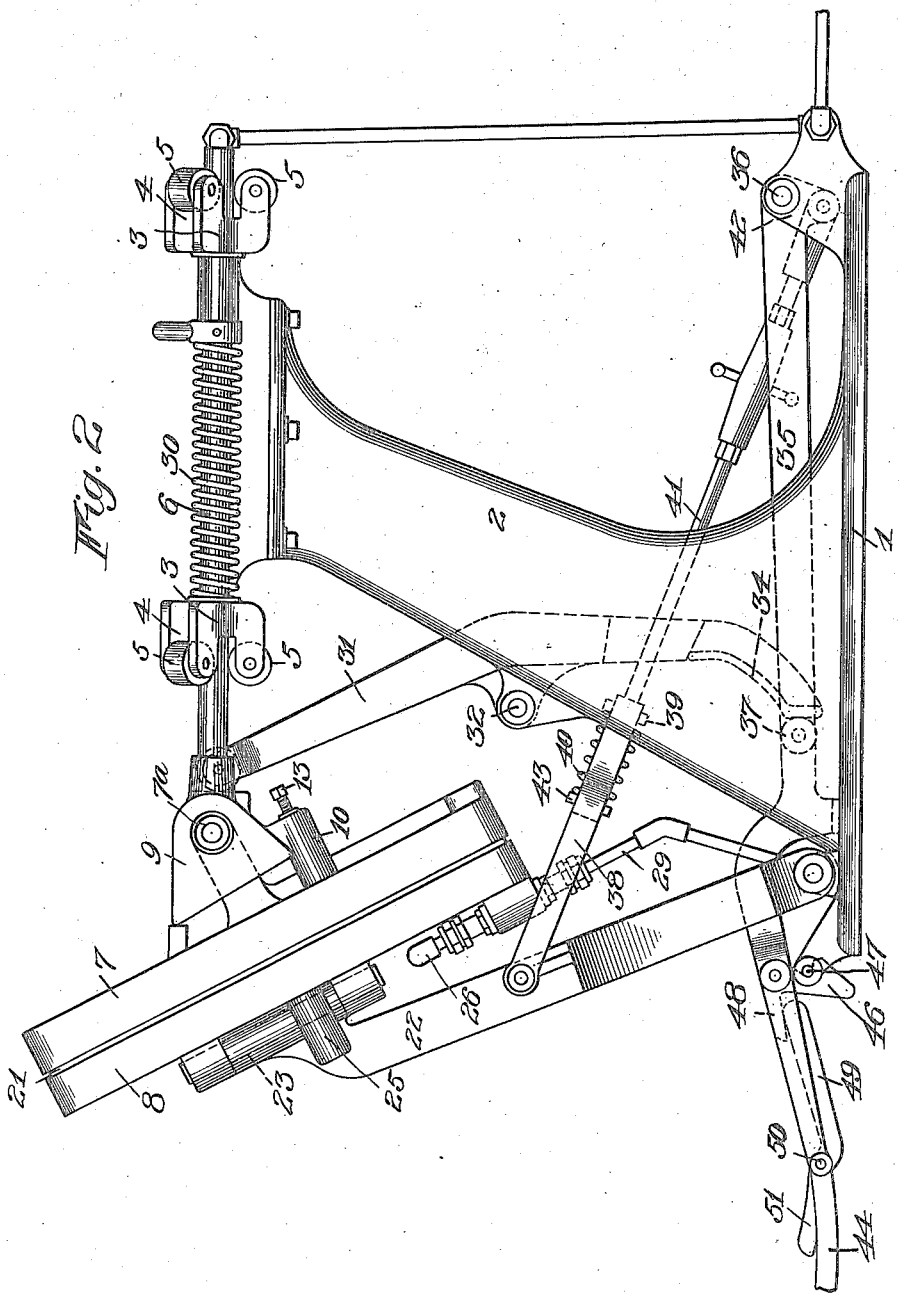

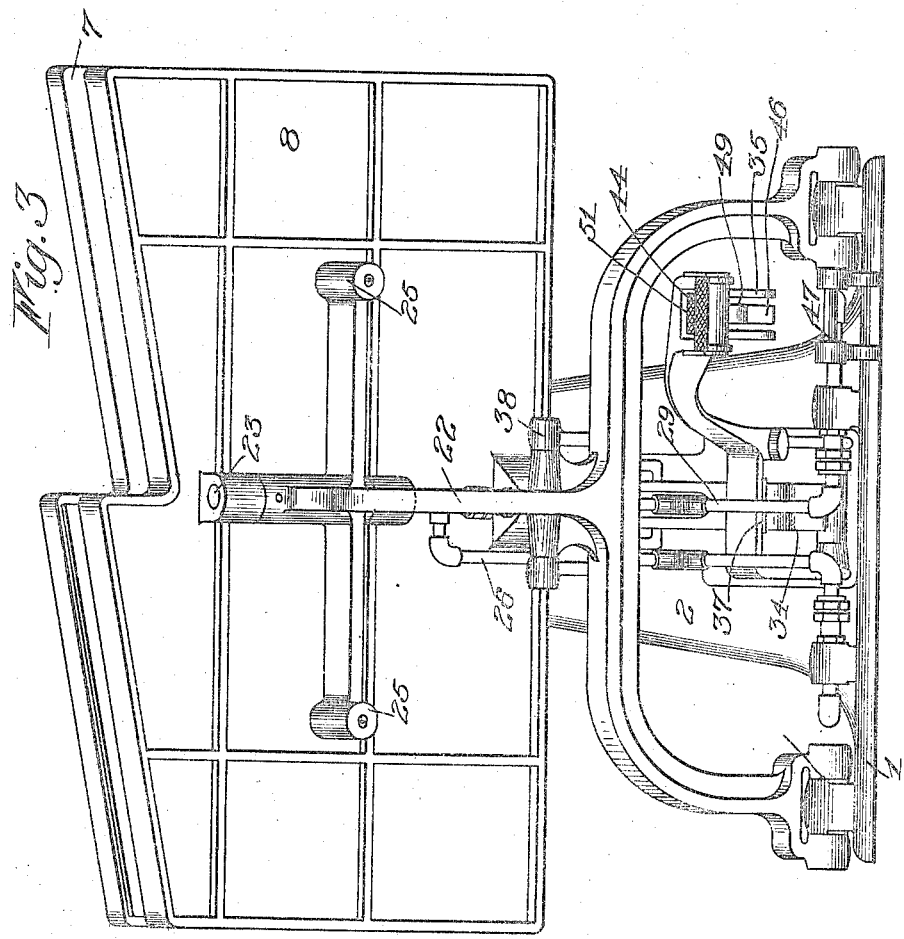

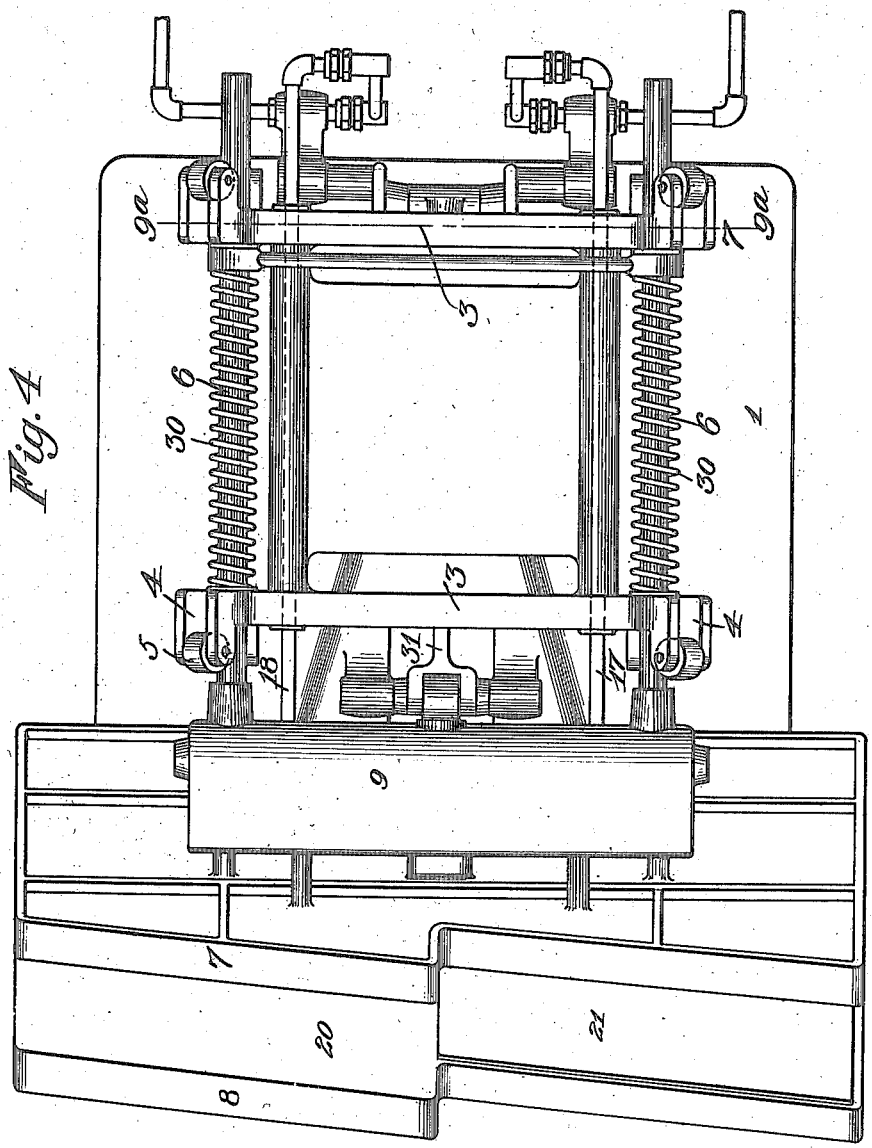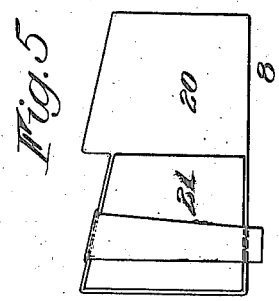

C. L. BRALEY.
GARMENT PRESSING MACHINE.
APPLICATION FILED SEPT. 4, 1915.
1,202,358.
Patented Oct. 24, 1916.
7 SHEETS—SHEET 5.
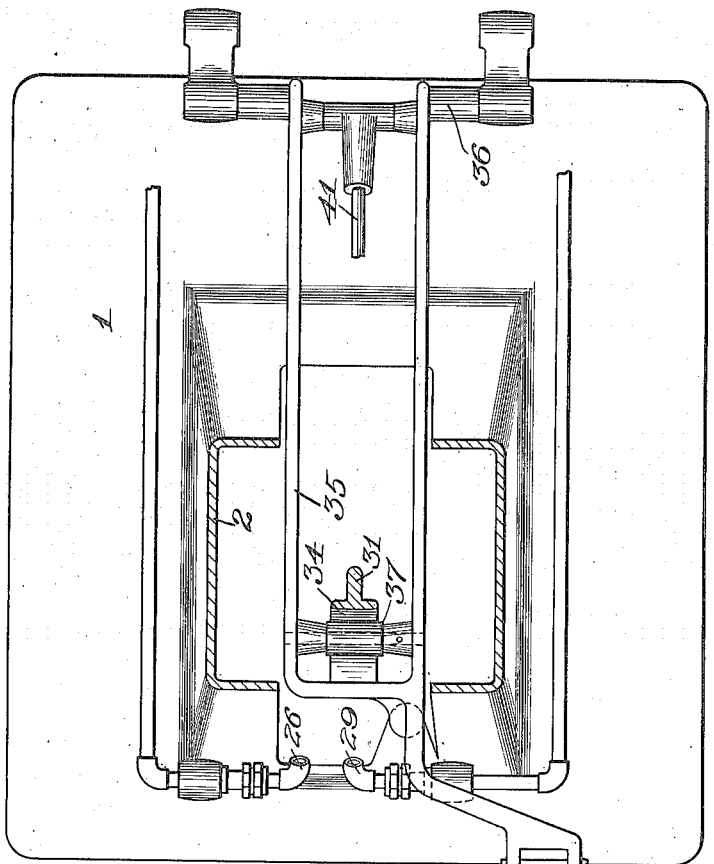
INVENTOR
Charles L. Braley
BY
his ATTORNEYS

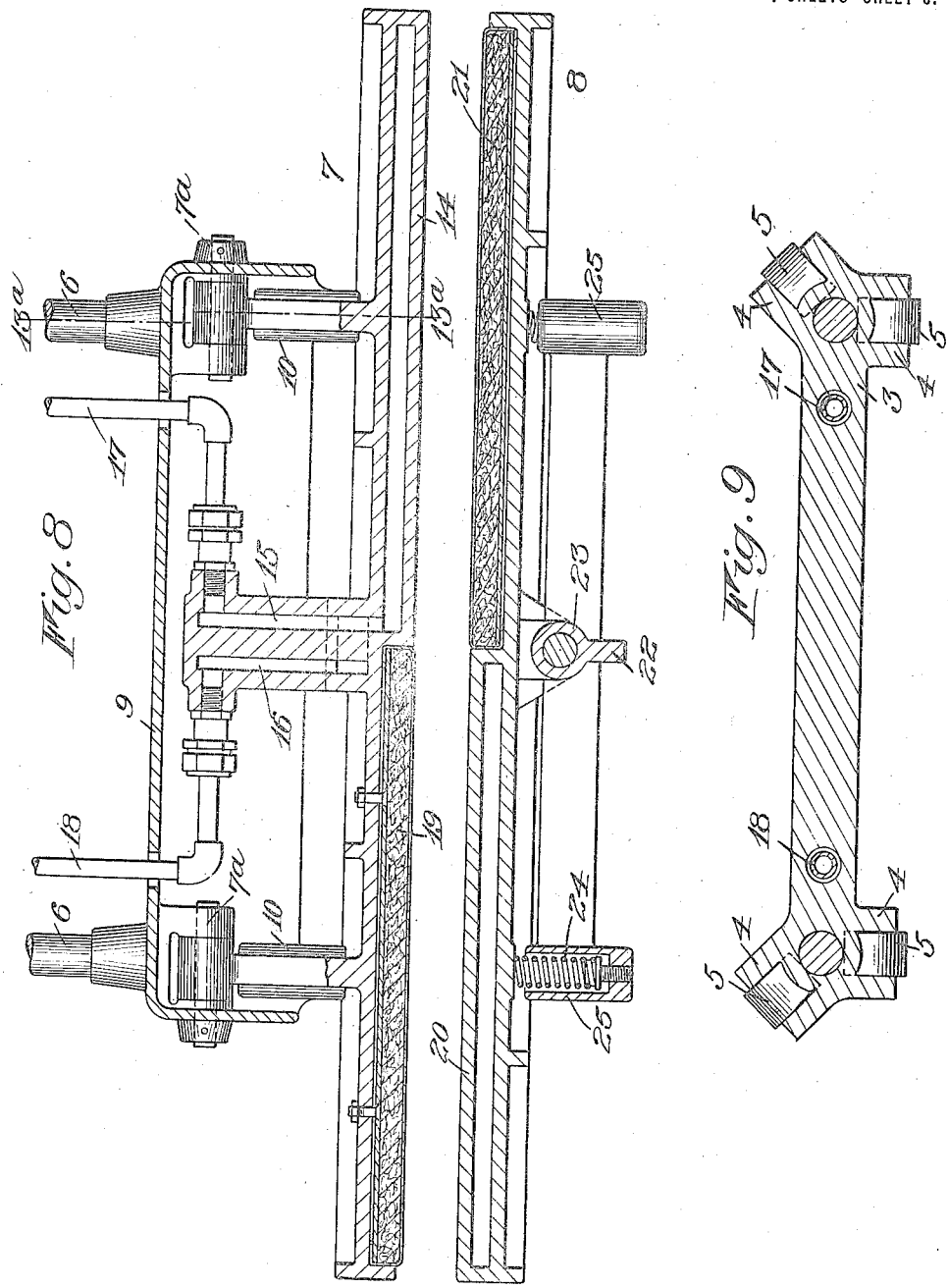

C. L. BRALEY.
GARMENT PRESSING MACHINE.
APPLICATION FILED SEPT. 4, 1915.
1,202,358.
Patented Oct. 24, 1916.
7 SHEETS—SHEET 7.
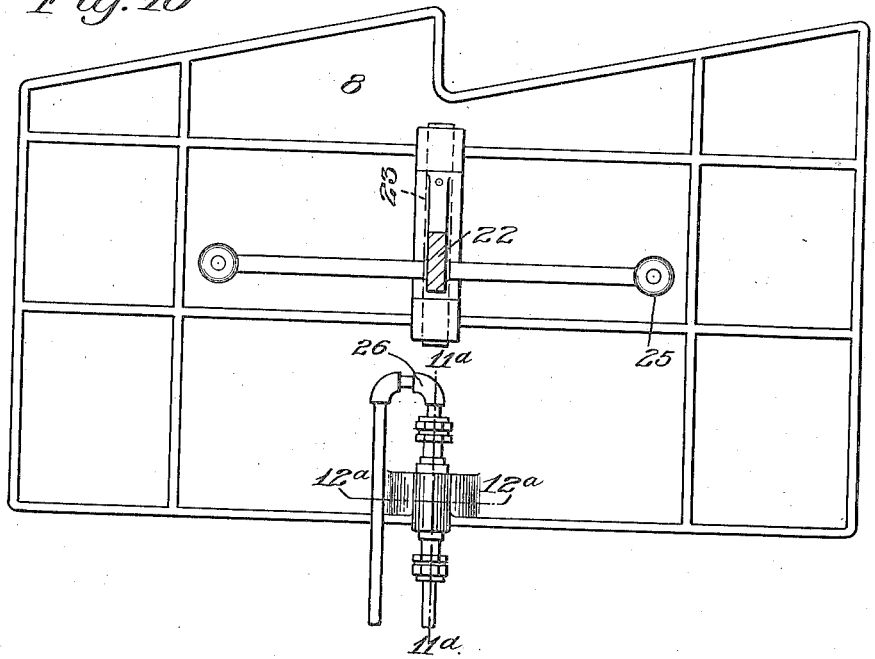
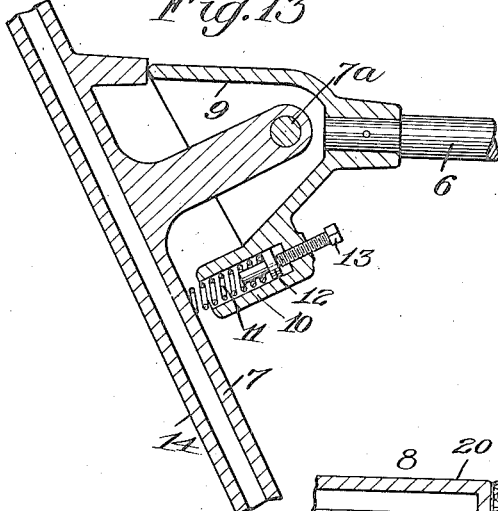
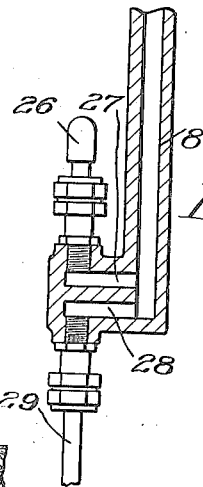
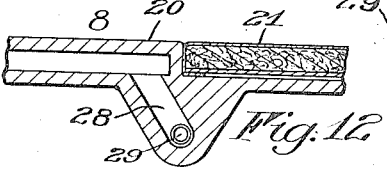
INVENTOR
Charles L. Braley
BY
his ATTORNEYS

UNITED STATES PATENT OFFICE.

CHARLES L. BRALEY, OF CHICAGO, ILLINOIS, ASSIGNOR TO THE AMERICAN LAUNDRY MACHINERY CO., OF CINCINNATI, OHIO, A CORPORATION OF OHIO.

GARMENT-PRESSING MACHINE.

1,202,358.

Specification of Letters Patent.    Patented Oct. 24, 1916.

Application filed September 4, 1915. Serial No. 49,019.

*To all whom it may concern:*

Be it known that I, CHARLES L. BRALEY, of Chicago, in the county of Cook and State of Illinois, have invented certain new and useful Improvements in Garment-Pressing Machines; and I do hereby declare the following to be a full, clear, and exact description of the same, reference being had to the accompanying drawings, forming a part of this specification, and to the reference-numerals marked thereon.

My invention relates to and has for its object to improve garment pressing and ironing apparatus of the type that may be employed for various kinds of work, such for instance, as sleeves of shirts, shirtwaists and the like or larger work if required, including generally a pair of relatively movable ironing members, the operation of which is controlled by the foot of an operator through one or more levers, and one of the chief purposes of my improvement is to lessen the labor of the operator by the provision of a novel arrangement that requires a minimum amount of power in applying an operative pressure.

A more particular object of the invention is to afford a machine in which the movable pressing or ironing member travels in a substantially horizontal direction to and from pressing position, as distinguished from machines of the prior art, which are generally characterized by having the movable pressing member travel in a vertical or partially vertical direction, which adds materially to the friction and resistance to be overcome by the operator.

Another object of my improvement is to enable an operator to readily and clearly see the work on the buck preliminarily to an ironing operation, thus assisting materially in the speed with which the work can be turned out and in the perfection of the results, and overcoming a serious disadvantage inherent in machines such as generally constructed where the relative arrangement of the pressing members prevents the operator from obtaining a full view of a piece of work on the buck.

Another purpose of the invention is to afford a new mechanism for operating a movable pressing member so as to develop maximum pressure with a minimum amount of labor.

An additional feature of my improvement resides in the particular form of the pressing members, which are so constructed as to accommodate, with accuracy and efficiency, articles of different lengths, and to permit ironing both sides of an article by merely shifting the same from one part of the machine to another, and obviating the necessity of operating on two separate machines in order to finish both sides.

A further feature contemplated by the present improvement consists in providing a particular form of controlling mechanism which enables an operator to readily hold the pressing members in operative relation for any desired period releasing them with the least possible exertion, or to obtain a series of quick successive operations.

To these and other ends, the invention consists in certain improvements and combinations of parts, all as will be hereinafter more fully described, the novel features being pointed out in the claims at the end of the specification.

In the drawings: Figure 1 is a side elevation illustrating a machine equipped with a preferred embodiment of my invention, and showing the pressing members in normal or separated relation, the dotted lines indicating the position of the pressing members when brought into initial engagement; Fig. 2 is a similar view with the parts in pressing relation; Fig. 3 is a front elevation; Fig. 4 is a plan view; Fig. 5 is a detail view, showing diagrammatically the position of a sleeve with relation to its supporting pressing member; Fig. 6 is a horizontal sectional view; Fig. 7 is an enlarged side elevation of the treadle controlling mechanism; Fig. 8 is a sectional view taken substantially on the line $8^a$—$8^a$ of Fig. 1; Fig. 9 is a sectional view taken on line $9^a$—$9^a$ of Fig. 4; Fig. 10 is a front view of one of the ironing members partially in section; Fig. 11 is a sectional view on the line $11^a$—$11^a$ of Fig. 10; Fig. 12 is a sectional view on the line $12^a$—$12^a$ of Fig. 10, and Fig. 13 is a sectional view on line $13^a$—$13^a$ of Fig. 8.

Similar reference characters in the several figures indicate the same parts.

In the present arrangement of parts, which is intended merely as an illustrative embodiment of my invention, that may with equal success be carried out in a number of different ways, 1 designates the base of the machine having an upwardly extending standard 2, provided at the top with a frame, including cross bars 3. The latter are provided at their ends with a series of ears 4 between which are mounted rollers 5, which form guides for the rods 6 on which is mounted one of the pressing members, as will be more fully described presently. The pressing members are arranged for relative movement in a substantially horizontal direction, and in the present arrangement are both movable, although this invention is not necessarily limited to this particular relation, but may be otherwise carried out to accomplish the general object of maintaining a horizontal or nearly horizontal direction of movement for operating the pressing members into and out of engagement with each other. I also propose to mount the pressing members so that their coöperating or meeting surfaces lie in a plane that is at an angle to the horizontal, and in the specific form shown, the pressing members engage each other in a plane extending downwardly from the front toward the rear of the machine, that is, downwardly away from the operator. With this in view, the pressing members preferably consist in the form shown generally at 7 and 8, Figs. 1 and 2, the pressing member or buck 7 being pivoted in bearings 7ª of a head 9 carried by the aforesaid rods 6. The buck 7 is maintained yieldably in normal relation to the head 9, and to this end the latter is provided with a socket 10, in which is mounted a spring 11 for engagement with the buck, the tension of said spring being adjustable by means of a follower 12 and set screw 13.

In order to provide for ironing opposite portions of a garment on the machine, I arrange the pressing members or bucks with alternately disposed ironing and padded surfaces, the ironing surface of one buck being opposed to a padded surface on the other, and by this means it is possible to impart a finish from an ironing surface to opposite sides of an article or garment by merely moving the latter along the buck from one position to another, which can be performed readily and quickly, and without entailing a great amount of work on the operator. To this end, in the present form of the device, the buck 7 comprises the ironing surface or chest 14 communicating with inlet and exhaust passages 15 and 16 to which are connected the steam or heating fluid pipes 17 and 18 respectively, while 19 designates a padded section or portion of the buck 7 arranged to coöperate with the ironing surface or chest 20 on the buck 8. The latter also carries a padded section 21 coöperating with the aforementioned ironing section 14 on the buck 7. The buck 8 is pivotally mounted on a supporting arm 22 in a bearing 23, and is yieldable thereon through the action of springs 24 mounted in sockets 25 and engaging the under face of the buck. The chest 20 in the buck 8 may be supplied with steam or other heating fluid in any convenient manner, as by means of inlet pipe 26 leading to the passage 27, while 28 is an exhaust opening communicating with the pipe 29. The bucks 7 and 8 are of varying widths from end to end, as shown clearly in Fig. 10, the object of which will appear from an inspection of Fig. 5. By arranging one edge of the buck on an incline with relation to the opposite edge, it is possible to properly iron a sleeve of any length, and the inclined edge is at such an angle with relation to the opposite edge of the buck as to properly coincide with the seam connecting the sleeve and body portions of a shirt. The length of a sleeve determines the position in which it is placed on the buck, and the operator adjusts it along the latter until the cuff seam coincides with the lower edge of the buck, while the upper or inclined edge is coincident with the shoulder seam, as illustrated clearly in Fig. 5. This particular feature of the invention has to do with the pressing of garment sleeves, although it will be understood that the machine can be employed for other ironing operations aside from this, and after an article is operated on at one end of the press, it is moved along to the corresponding position at the other end, the operation being repeated, thus serving to finish the garment on both sides. The movable buck 7 is returned to its normal position by means of springs 30, and 31 designates a lever pivoted on the standard at 32 and connected to the head 9, as shown in Figs. 1, 2 and 4. The lever 31 is provided at its lower end with a cam surface 34 by which it is engaged and operated to move the buck 7 into pressing position.

35 is a treadle or foot lever pivoted at 36, and carrying a projection or roller 37 for engagement with the cam surface 34, so that when the treadle 35 is depressed, the lower end of lever 31 is moved rearwardly, and the upper end forwardly through the said cam surface 34, until the parts are brought into pressing engagement. It is desirable also to impart a slight movement to the forward buck or pressing member 8, and in order to accomplish this, I mount on the arm 22 a connection 38, provided with a collar 39 against which rests a spring 40, while 41 designates a rod connected at one end to an extension 42 of the treadle 35, and having a head 43 on its opposite end arranged to engage the spring 40, thus providing a yieldable connection between treadle 35 and arm 22, which imparts a slight movement to the buck 8, as the buck 7 is brought forwardly. The bucks or pressing members are brought into engagement initially at their lower edges, as shown in Fig. 1 in dotted lines, to grip the article and permit the operator to stretch the same during the final closing movement of the pressing member, and the arrangement described insures an even and regular pressure throughout. Operation of the treadle 35 is effected from a foot engaging portion 44, adjacent to which is arranged an opening 45 for a purpose that will now appear. In order to maintain the treadle depressed, the latter carries a locking member, preferably in the form of a pivoted pawl 46 arranged to engage a stationary part or projection 47, as shown in Fig. 2. The pawl 46 includes a tail piece 48 by which it is released through a supplemental treadle 49 pivoted on the main treadle at 50, and having a foot engaging portion 51 movable within the recess 45, as shown in Fig. 6. Upon depressing the treadle 35 to its lowermost position, the parts are locked in the position shown in Fig. 2, until the locking member is released by depressing the supplemental treadle 49. The arrangement shown is especially unique and advantageous in that it affords convenient means for permitting the operator to obtain either a continued pressing operation or a series of quicker operations. By placing a foot only on portion 44 of the treadle 35, the pressing members will be locked when the treadle is depressed, and a second operation is required to release it, but by placing the foot so as to engage also the portion 51 of the supplemental treadle, it will be seen that the pawl 46 will be maintained out of locking relation with the projection 47, and upon release of pressure the parts will assume their normal position, as shown in full lines in Fig. 1.

While I have described a particular form of machine in order to set forth the feature of my improvement, it is not the intention to limit the invention in any sense to any of the arrangements disclosed, as I believe it to be new in the art of garment pressing to provide mechanism for moving a pressing member in a horizontal or substantially horizontal direction into and out of pressing relation with another pressing member, and further to so arrange the bucks or pressing members as to afford the operator a full view of the work at the time the latter is being placed in position preliminarily to completing the ironing operation, and I desire to cover by this application any modifications or other arrangements that may come within the spirit of my invention, as defined more particularly by the claims hereto appended.

I claim as my invention:

1. A garment pressing machine including a pair of pressing members the meeting plane of which when in pressing relation is inclined downwardly from the front toward the rear of the machine.

2. A garment pressing machine including a pair of pressing members movable relatively in a substantially horizontal direction and meeting, when in pressing relation, in a plane that is inclined downwardly from the front toward the rear of the machine.

3. A garment pressing machine including a pair of pressing members, both of which are movable toward and from each other, and the meeting plane of which when in pressing relation is inclined downwardly from the front toward the rear of the machine.

4. A garment pressing machine including a pair of pressing members, one movable with relation to the other in a substantially horizontal direction, the meeting plane of which when in pressing relation is inclined downwardly from the front toward the rear of the machine.

5. A garment pressing machine including a pair of pressing members each of which has alternately arranged ironing and padded surfaces coöperating with padded and ironing surfaces respectively on the other member, whereby opposite sides of a garment may be ironed by shifting it away from one part of the machine to the other and without entirely removing it.

6. An ironing machine comprising a movable ironing member, a treadle for controlling the ironing member, a locking member carried by the treadle and coöperating with a stationary part to hold the treadle in operated position, the treadle including a foot engaging portion and an opening adjacent thereto, and a supplemental treadle having a foot engaging portion arranged in said opening and coöperating with the locking member to release the same.

7. An ironing machine comprising a movable ironing member, a treadle for controlling the ironing member having a foot engaging portion at its outer end and an opening adjacent thereto, a locking member carried by the treadle and coöperating with a stationary part to hold the treadle in operated position, and a supplemental treadle having a foot engaging portion arranged in said opening between the sides of the first named treadle and coöperating with the locking member to release the same.

8. In an ironing machine, the combination with a pair of ironing members, one having horizontal movement relatively to the other, of a lever connected to the movable member and provided with a cam surface, and an operating member having means arranged to engage said cam surface for actuating the movable ironing member.

9. In an ironing machine, the combination with a pair of ironing members movable into and out of ironing relation with each other, of a lever connected to one of the members and provided with a cam surface, an operating member having means arranged to engage said cam surface, and connections between the operating member and the other of said ironing members for imparting movement to the latter.

CHARLES L. BRALEY.

Witnesses:
MICHAEL DALY,
TY CRESSWICH.